US009994732B1

(12) United States Patent
Johnson

(10) Patent No.: US 9,994,732 B1
(45) Date of Patent: Jun. 12, 2018

(54) POLYSILAZANE AND FLUOROACRYLATE COATING COMPOSITION

(71) Applicant: Steven Martin Johnson, Franklin, OH (US)

(72) Inventor: Steven Martin Johnson, Franklin, OH (US)

(73) Assignee: Steven Martin Johnson, Franklin, OH (US)

( * ) Notice: Subject to any disclaimer, the term of this patent is extended or adjusted under 35 U.S.C. 154(b) by 144 days.

(21) Appl. No.: 14/851,919

(22) Filed: Sep. 11, 2015

Related U.S. Application Data

(60) Provisional application No. 62/049,713, filed on Sep. 12, 2014.

(51) Int. Cl.
| | |
|---|---|
| *C09D 183/16* | (2006.01) |
| *C09D 133/16* | (2006.01) |
| *C08L 83/16* | (2006.01) |
| *C08L 33/16* | (2006.01) |

(52) U.S. Cl.
CPC ......... *C09D 183/16* (2013.01); *C09D 133/16* (2013.01); *C08L 33/16* (2013.01); *C08L 83/16* (2013.01)

(58) Field of Classification Search
CPC ....... C08L 83/16; C08L 33/16; C09D 183/16; C09D 133/16
See application file for complete search history.

(56) References Cited

U.S. PATENT DOCUMENTS

| | | | |
|---|---|---|---|
| 2,564,674 A | 8/1951 | Cherenls | |
| 5,178,916 A | 1/1993 | Chidsey et al. | |
| 5,266,115 A | 11/1993 | Taccon et al. | |
| 5,821,022 A | 10/1998 | Ohishi et al. | |
| 6,207,346 B1 | 3/2001 | Johnson | |
| 6,444,378 B1 | 9/2002 | Johnson | |
| 6,660,392 B2 | 12/2003 | Yamaguchi et al. | |
| 7,141,140 B2 | 11/2006 | Maccone et al. | |
| 7,261,768 B2 | 8/2007 | Luten et al. | |
| 7,471,503 B2 | 12/2008 | Bruner et al. | |
| 7,622,157 B2 | 11/2009 | Falk et al. | |
| 7,625,149 B2 | 12/2009 | Hanson et al. | |
| 7,691,478 B2 | 4/2010 | Avaltroni et al. | |
| 7,740,940 B2 | 6/2010 | Hanson | |
| 7,879,437 B2 | 2/2011 | Hanson | |
| 7,901,777 B2 | 3/2011 | Hanson | |
| 7,989,069 B2 | 8/2011 | Bruner et al. | |
| 8,025,974 B2 | 9/2011 | Hanson et al. | |
| 8,048,487 B2 | 11/2011 | Hanson | |
| 8,053,081 B2 | 11/2011 | Petcavich et al. | |
| 8,067,103 B2 | 11/2011 | Hanson | |
| 8,178,004 B2 | 5/2012 | Hanson | |
| 8,236,426 B2 | 8/2012 | Hanson et al. | |
| 8,309,228 B2 | 11/2012 | Dierdorf et al. | |
| 8,329,830 B2 | 12/2012 | Yang et al. | |
| 8,337,985 B2 | 12/2012 | Hanson | |
| 8,432,036 B2 | 4/2013 | Hanson et al. | |
| 8,445,423 B2 | 5/2013 | Bruner et al. | |
| 8,524,367 B2 | 9/2013 | Hanson | |
| 8,558,117 B2 | 10/2013 | Hanson | |
| 8,658,258 B2 | 2/2014 | Hanson | |
| 2002/0111391 A1* | 8/2002 | Ishizeki | C09D 4/00 522/120 |
| 2003/0234272 A1 | 12/2003 | Lamothe et al. | |
| 2004/0023048 A1 | 2/2004 | Schwartz et al. | |
| 2008/0131709 A1 | 6/2008 | Hanson et al. | |
| 2008/0152930 A1 | 6/2008 | Hanson | |
| 2009/0140028 A1 | 6/2009 | Forti et al. | |
| 2009/0317554 A1 | 12/2009 | Christensen et al. | |
| 2010/0015453 A1 | 1/2010 | Yamaguchi et al. | |
| 2010/0331487 A1 | 12/2010 | Yang et al. | |
| 2010/0331498 A1 | 12/2010 | Yang et al. | |
| 2011/0195246 A1 | 8/2011 | Hanson et al. | |
| 2012/0189843 A1 | 7/2012 | Chang et al. | |
| 2013/0037161 A1 | 2/2013 | Hanson et al. | |
| 2013/0229378 A1 | 9/2013 | Iyer et al. | |
| 2014/0272150 A1 | 9/2014 | Hanson | |
| 2014/0272428 A1 | 9/2014 | Hanson | |
| 2014/0329001 A1 | 11/2014 | Rouaud et al. | |
| 2015/0252656 A1 | 9/2015 | Hanson | |

FOREIGN PATENT DOCUMENTS

| | | |
|---|---|---|
| CA | 2626990 A1 | 5/2007 |
| CN | 102137722 A | 7/2011 |
| EP | 0513727 A2 | 11/1992 |
| EP | 0513727 B1 | 8/1995 |
| EP | 0745568 A1 | 12/1996 |
| EP | 0745567 B1 | 4/1999 |

(Continued)

OTHER PUBLICATIONS

Elif Alyamac & Mark D. Soucek, "Acrylate-based fluorinated copolymers for high-solids coatings", 71 Progress in Organic Coatings 213-224 (2011).
Steve Henly, "New Generation Fluoropolymer Coatings for Electronic Applications", Feb. 9, 2011; 5 pages.
"3M Electronic Grade Coatings", Walborn A/S, Sep. 21, 2013 (available at: www.walbom.dk/ref.aspx?id=4858); 3 pages.

(Continued)

*Primary Examiner* — Margaret G Moore
(74) *Attorney, Agent, or Firm* — Ulmer & Berne LLP

(57) ABSTRACT

A hydrophobic and oleophobic coating composition includes at least a polysilazane polymer and a fluoroacrylate copolymer. The coating composition can be applied to a substrate in a single-step process as a thick and durable polymeric layer. Methods for making the coating composition and related articles are also provided.

18 Claims, No Drawings

(56) References Cited

FOREIGN PATENT DOCUMENTS

| EP | 0745568 B1 | 7/1999 |
|---|---|---|
| EP | 1378526 A1 | 7/2004 |
| EP | 1955638 B1 | 4/2012 |
| EP | 1570014 B1 | 3/2013 |
| WO | 2006071981 A1 | 7/2006 |
| WO | 2008042986 A2 | 4/2008 |
| WO | 2008060582 A2 | 5/2008 |
| WO | 2008060583 A2 | 5/2008 |
| WO | 2009008993 A2 | 1/2009 |

OTHER PUBLICATIONS

"Features and Benefits—Lumiflon FEVE Resins", http://lumiflonusa.com/features-benefits/ (accessed Feb. 25, 2016); 9 pages.

International Search Report (ISR) and Written Opinion of the Searching Authority in App No. PCT/US2016/060410 dated Mar. 17, 2017.

\* cited by examiner

POLYSILAZANE AND FLUOROACRYLATE COATING COMPOSITION

REFERENCE TO RELATED APPLICATIONS

The present application claims the priority of U.S. provisional application Ser. No. 62/049,713, entitled POLYSILAZANE AND FLUOROACRYLATE COATING COMPOSITION, filed Sep. 12, 2014, and hereby incorporates the same application herein by reference in its entirety.

TECHNICAL FIELD

The present disclosure generally relates to curable coating compositions including a polysilazane and a fluoroacrylate copolymer that produce highly durable and effective coating layers in a single-step curing process, wherein such coating layers can have hydrophobic and oleophobic properties.

BACKGROUND

Compositions that form hydrophobic and oleophobic coatings can be useful to render surfaces repellant to both water-based and organic-based materials. Such surfaces having hydrophobic and oleophobic properties would generally be easier to clean, be non-staining, and have a low surface energy. Surfaces with a low surface energy can be useful, for example, in relation to industrial and consumer goods to provide a high degree of slip, or anti-stiction, to materials that contact the surface. Prior hydrophobic and oleophobic coatings, however, often suffer from a number of detriments that prevent their widespread adoption, including poor durability, relatively thin coatings, and the need to apply the coating using a multi-step process. Therefore, there is a need for a durable coating and a simplified application process whereby the durable coating can easily be applied to render a substrate both hydrophobic and oleophobic.

SUMMARY

In accordance with one embodiment, a coating composition includes a polysilazane and a fluoroacrylate copolymer. The polysilazane has at least one reactive site.

In accordance with another example, a method of forming a coated article includes the steps of providing a substrate, coating the substrate with a coating composition, and curing the coating composition. The coating composition includes a polysilazane and a fluoroacrylate copolymer. The polysilazane has at least one reactive site.

In accordance with yet another example, an article includes a substrate, and a hydrophobic coating layer adhering to at least a portion of the substrate. The hydrophobic coating layer is formed from a coating composition. The coating composition includes polysilazane and a fluoroacrylate copolymer. The polysilazane has at least one reactive site.

DETAILED DESCRIPTION

Coating compositions that impart hydrophobic and oleophobic qualities to a substrate can generally include a suitable polysilazane and a suitable fluoroacrylate copolymer. On a dry solids weight basis, the fluoroacrylate copolymer can be included in a coating composition at about 1 part fluoroacrylate copolymer to about 3 parts polysilazane in certain embodiments, up to about 1 part fluoroacrylate copolymer to about 800 parts polysilazane in other certain embodiments. In certain embodiments, the combined fluoroacrylate copolymer and polysilazane can constitute, on a dry solids weight basis, from about 0.1% to about 90.0% of a coating composition, from about 20% to about 60% of the coating composition in certain embodiments, and from about 30% to about 40% of the coating composition in certain embodiments.

Suitable polysilazanes can generally include curable oligomeric and polymeric polysilazanes having a common repeating unit represented by Formula 1.

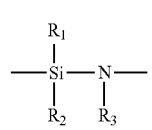

Formula 1 wherein $R_1$, $R_2$, and $R_3$ are each independently hydrogen, an organic group, a heterorganic group, or a combination thereof.

Specific polysilazanes useful in the formation of a coating composition can include polysilazanes that have at least one chemically reactive site. For example, suitable polysilazanes can include one, or more, of the following reactive sites: silicon-nitrogen linkages, hydrogen bonds, and carbon-carbon bonds. As can be further appreciated, such polysilazanes can be any polymer that has at least one linear, cyclic, or branched main chain or backbone formed from repeating Si—N linkages.

The specific molecular structure, molecular weight, and functional groups of suitable polysilazanes can be tailored to meet the particular properties and performance desired in a coating composition. For example, in certain embodiments, a suitable polysilazane can have a number average molecular weight of about 100 to about 50,000 to ensure the coating composition can be applied to a substrate in liquid form.

Suitable polysilazanes can be produced through any desirable process including, for example, the process disclosed in U.S. Pat. No. 2,564,674 which is hereby incorporated by reference in its entirety. As will be appreciated, other methods can also be used to produce suitable polysilazanes.

Modified polysilazanes or polysilazane copolymers can also be utilized. Such modified polysilazanes or polysilazane copolymers can have random, alternating, or block copolymer structures or combinations. Modified polysilazanes and copolymers can be produced in a suitable aprotic solvent, such as, for example, ethyl acetate, t-butyl acetate, or combinations thereof and can be further diluted by one, or more, solvents if desired.

Alternatively, suitable polysilazanes can be commercially obtained. Examples of commercially available suitable polymers include, for example, Ceraset® 20 from Kion Corp. (Huntington Valley, Pa.,) with has the following structure of Formula 2:

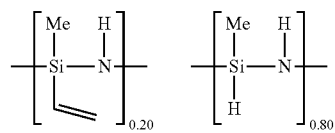

Formula 2

Another commercially available polysilazane is VL 20 from Kion Corp. (Huntington Valley, Pa.) with has the structure of Formula 3:

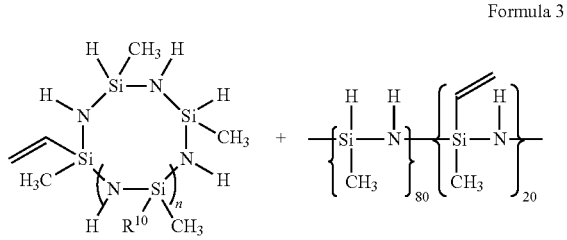

Formula 3 wherein n is an integer value ranging from 1-20, and $R^{10}$ is hydrogen or a vinyl group.

Other commercially available polysilazane polymers include, but are not limited to those sold under the trade name, Metal Protector from nanoShell Coatings (Plymouth, Devon, UK), Durazane from A.Z. Chemicals (Charlotte, N.C., USA), Polymeric Silazane Finish ("PSF") from KadKo Incorporated (Beech Grove, Ind.), and MC156 from NIC Industries (White City, Oreg.).

In certain embodiments, a polysilazane can be prepared as a solution in a suitable solvent such as, for example, an aprotic solvent. Such solvents are well known and include, as illustrative examples, tert-butyl alcohol, and amyl acetate. It will be appreciated that other suitable aprotic solvents may be used.

Additional solvents that can be suitable for dilution of the polysilazane or the coating composition include fluorinated solvents such as ethyl nonafluorobutyl ether, ethyl nonafluoroisobutyl ether, and parachlorobenzotrifluoride. Examples of commercial fluorinated solvents include Novec™ hydrofluoroether solvents available from 3M Corporation (St. Paul, Minn.) and Galden® perfluorinated fluids available from Solvay Chemicals (Orange, Tex.).

In certain embodiments, additional solvents such as mineral spirts and hydrocarbon solvents can also be present in the coating composition.

Suitable fluoroacrylate copolymers useful for inclusion in the coating composition can include copolymers having at least a fluorinated moiety and an acrylate moiety. Such fluorinated moieties can generally be represented by Formula 4:

$$R_{(a)}-Y_{(b)}-$$  Formula 4 wherein R is a monovalent or multivalent, linear, branched, alicyclic or aromatic, fluorinated or perfluorinated, organic or heterorganic group, or a combination thereof containing at least one perfluorinated carbon atom and (a) is at least 1; and Y is independently a covalent bond or a divalent linear, branched, alicyclic, or aromatic organic or heterorganic linking group or a combination thereof, and can optionally be fluorinated or perfluorinated, and can optionally have cross-linkable sites, and (b) is 0 or greater.

Suitable acrylate moieties for the fluoroacrylate copolymer can generally be represented by Formula 5:

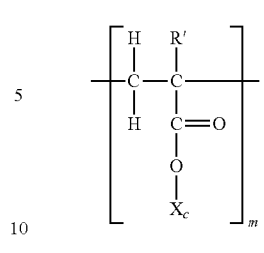

Formula 5 wherein $X_c$ can be a monovalent or multivalent, linear, branched, alicyclic or aromatic, fluorinated or perfluorinated, organic or heterorganic group or a combination thereof, and contains at least one perfluorinated carbon atom and c is a least 1; R' is H, $CH_3$, F, or another functional group; and m is at least 2. As can be appreciated, in certain embodiments, $X_c$ can also be $R_{(a)}-Y_{(b)}$ as represented in Formula 4.

As will be appreciated, suitable fluoroacrylate copolymers can contain additional functional groups or moieties in addition to the fluorinated moieties and acrylate moieties. The inclusion of other functional groups and the properties of the bulk fluoroacrylate copolymer can be selected to tailor specific properties of the coating composition including, for example, adhesion strength, viscosity, and durability.

In certain embodiments, suitable fluoroacrylate copolymers can react with at least one of the reactive sites of a suitable polysilazane polymer. For example, a fluoroacrylate copolymer can react with one or more of the silicon-nitrogen, nitrogen-hydrogen, silicon-hydrogen, or hydrogen bonding reactive sites on a suitable polysilazane. As will be appreciated, the structure of the fluoroacrylate copolymer can influence the degree and kinetics of such a reaction. For example, in certain embodiments, the fluoroacrylate can be linear, or branched, and can be of any suitable molecular weight.

In certain embodiments, it can be useful to react the fluoroacrylate copolymer with a polysilazane in a liquid solution. Suitable fluoroacrylate copolymers can be produced as a solution by dissolving a solid fluoroacrylate copolymer in a suitable solvent. In such solutions, the weight percent of solid fluoroacrylate copolymer can vary from about 0.1% to about 10%, or more, in certain embodiments, from about 0.5% to about 5% in certain embodiments, and from about 1.0% to about 2.0% in certain embodiments. It can be appreciated that the fluoroacrylate copolymer solution can, however, be further diluted by one or more solvents as needed depending on the desired properties of the coating composition.

The solvent or combinations of solvents chosen can be determined by the solubility of the monomers and resultant polymers. Conventional solvents such as ethyl acetate, t-butyl-acetate, methyl ethyl ketone, and acetone can be used. As can be appreciated however, fluorinated solvents can also be used including chlorofluorocarbon solvents, hydrofluoroether solvents, and the like. In certain embodiments, combinations of conventional solvents and fluorinated solvents can also be used to modify the solubility and boiling points of the coating composition. Modification and selection of such combinations can be used to tailor the properties of the coating composition including for example, drying and curing times, or substrate compatibility. As a specific example, a less viscous solution can be used when the coating composition is intended for use on smoother substrates.

Suitable fluoroacrylate copolymers can be produced by any known method including for example, the methods disclosed in International Application WO 2006/071981; U.S. Pat. No. 5,821,022; and European Patent App. 1,378,526 each herein incorporated by reference in their entirety. A journal article by Alyamac and Soucek, in Progress in Organic Coatings 71 (2011) 213-224, further discusses methods useful in the preparation of fluoroacrylate copolymers.

Alternatively, in certain embodiments, commercial fluoroacrylate copolymers can be used. For example, commercial fluoroacrylate copolymers including APG-658 and APG-801 by Advanced Polymer Inc. (Carlstadt, N.J.), Novec 1700 and Novec 2702 by 3M Co. (St. Paul, Minn.) and APS 2324CA can be used as suitable fluoroacrylate copolymers. In certain embodiments, Novec 1720, a 0.1% fluorosilane available from 3M Co. (St. Paul, Minn.) can also be used.

A coating composition can be formed from mixing a suitable solution of polysilazane and a suitable solution of fluoroacrylate copolymer. In certain embodiments, additional solvents can be added to improve certain properties of the coating composition such as, for example, the solubility and boiling point of the coating composition. The additional solvent can be an aprotic solvent, a fluorinated solvent, or a combination thereof. Selection and quantity of the solvent compounds can allow the coating composition to be tailored for specific substrates and for drying time.

In certain embodiments, the coating composition can be formed from the mixture of polysilazane and fluoroacrylate copolymer by slowly mixing with a low-shear mixer or other appropriate stirring mechanism until a homogenous composition is reached. For example, mixing speeds of about 200 rpm to about 500 rpm can be used. The coating composition can, in certain embodiments, be formed at room temperature (e.g., at about 23° C.).

As can be appreciated, other additives can be added to the coating composition in certain embodiments. For example, one or more color dyes or pigments, UV or light stabilizers, antioxidants, flame retardants, antimicrobial compounds, stabilizers, fillers, solvents, rheology modifying agents, or other ancillary material can be added to the coating composition. Such additives can be added to the coating composition in any order and in any suitable quantity. Fillers can be used to adjust rheology, reduce polymer demand, improve hardness, scratch-resistance, modulus or other properties. Non-limiting examples of such fillers include inorganic particles such as, for example, silicon dioxide, aluminum oxide, cerium oxide, tin oxide, zinc oxide, clays, barium sulfate, and talc. Organic functional fillers and powders, including for example, micronized polytetrafluoroethylene can also be used.

Additionally, one or more, monomers, oligomers or polymers can be incorporated into the coating composition to impart, or control, certain qualities of the coating composition. Non-limiting examples of such additional monomers, oligomers, and polymers include epoxies, urethanes, acrylics, and silicone.

In certain embodiments, a coating composition can be filtered once mixed using any known filtering technique such as, for example, through use of filter paper, filter cartridges, or filter bags. Filtering can be performed to remove certain additives or to create a more uniform distribution of additives and the filter size and level can be selected based on these application requirements. A suitable example of a filtering method is the use of 0.45 micron polytetrafluoroethylene syringes filter to filter the coating composition.

The coating composition can be used immediately or stored for future use. The coating composition can be stable and used indefinitely, as long as the components remain in solution. However, for long-term storage of the coating composition, it can be advantageous to contain or vent ammonia which is gradually outgassed from polysilazane. Such outgassed ammonia can be contained or vented by any suitable means. Alternatively, the ammonia can also be displaced by inert nitrogen gas.

The coating composition can be applied to a substrate and cured in a single-step process to form a hydrophobic and oleophobic coating layer on the substrate. The curing process can involve the evacuation of the solvent through evaporation and the coincident curing of the reactive components. Evacuation of the solvent can take place at ambient temperature or can be accelerated by use of elevated temperatures (e.g., temperatures of about 100° C. or more). However, it should be appreciated that elevated temperatures are not needed and the entire curing process can take place at about room temperature (e.g., at about 23° C.).

In certain embodiments, the reactive components can cure through one, or more, coincident reactions including reaction of the fluoroacrylate copolymer with reactive groups on the polysilazane; independent curing of the polysilazane; and covalent bonding of silanol groups on the polysilazane to hydroxyl groups of the substrate. Such reactions are considered coincident in that the reactions take place in the same process step but not necessarily the same time. For example, in certain embodiments, at least one of the reactions can take place at a different time than one of the other reactions. For example, the polysilazane can bond to a substrate before reacting to the fluoroacrylate copolymer in certain embodiments. The coincident reactions can occur in a single process step that occurs over a period of time from about a 0.5 hour to about 120 hours. As will be appreciated, the selection of particular polysilazanes, and fluoroacrylate copolymers can affect the amount and quantity of reactions between such components and the ultimate properties of the cured coating composition.

In certain embodiments, moisture can be introduced, directly or indirectly, to accelerate the reaction. Additionally, or alternatively, known moisture curing catalysts can also be included in the coating composition. Such catalysts can include, but is not limited to, ammonia and the catalysts disclosed in U.S. Patent App. No. 2010/0331498 herein incorporated by reference. Moisture cure catalysts can be present in amounts ranging from about 0.1% to about 10%, by weight, based on a dry weight basis of the catalyst and polysilazane. Curing can be accomplished at room temperature or thermal energy may be utilized including, for example, convection or induction heating, irradiation from an electron beam generator or microwave, or radiation.

Such coating compositions can be applied to a large variety of articles including, without limitation, mobile devices, glass substrates in transportation and construction industries, polymeric parts, metal parts, and paint surfaces. Specific substrates can offer specific benefits. For example, substrates with oxides on the surface such as cold rolled steel, iron, copper, brass, stainless steel, glass, ceramics, and the like will enable covalent bonding to the coating composition by bonding to silanol groups of certain polysilazane polymers. In such cases, hydroxyl groups on the substrate can be activated in any suitable process, such as, for example, the use of an alkaline cleaner. However, the coating composition can still be applied to surfaces, such as certain polymers, without hydroxyl groups. On such substrates without hydroxyl groups, the coating composition can adhere, for example, through physical force.

In certain embodiments, a polysilazane and fluoroacrylate coating composition can also be used as an additive to improve other coating materials and resins. Additionally, the coating composition can also be utilized as a surface-active agent, to coat, for example, inorganic fillers, thus improving hydrophobicity, oleophobicity, or dispensability.

The coating composition can exhibit a variety of beneficial qualities when cured on a substrate. For example, the coating can be a thick, durable coating that has a high degree of hydrophobicity and oleophobicity. In certain embodiments, the contact angle of water on the cured hydrophobic coating layer can be about 80° to about 120°, or more, when measured in accordance with ASTM D7334-08. A water contact angle of about 80° to about 120°, or more, can indicate the coating layer is hydrophobic.

In certain embodiments, the contact angle of n-hexadecane on the cured hydrophobic coating layer can be about 50° to about 80°, or more. Measurement of the contact angle of n-hexadecane can generally indicate oleophobicity with contacts angles of about 50° to about 80°, or more, considered oleophobic. Oleophobicitiy can, in certain embodiments, also be indicated by the speed at which a drop of isopropyl alcohol pulls back from a cured coating layer.

Additionally, the cured coating composition can have a low surface energy. The surface energy of a coating measures the ability of a coating to repel liquids and solids. The coating composition can, in certain embodiments, exhibit a surface energy of about 10 to about 20 dynes/cm$^2$.

In certain embodiments, the cured coating composition can be applied over a wide range of thicknesses. The thickness of the coating can be dependent on the application and environment in which the coated article is employed. For example, the coating composition can be as thin as about 0.1 micron while retaining good durability but can be produced in thicker layers if desired. For example, the coating can have a thickness from about 0.1 micron to about 10 microns in certain embodiments, from about 10 microns to 100 microns in certain embodiments, and from about 100 microns to about 1 mm in certain embodiments. The use of thicker layers can be useful, for example, when the coating composition is applied to rough substrates as a thicker coating can conform to irregularities in the substrate and create a substantially planar surface.

EXAMPLES

Inventive examples (identified as Examples 1-12) were prepared by mixing the components listed in Tables 1A and 1B, by weight, in a 1 L glass beaker using an IKA RW 20 digital mixer (Cole-Parmer Co.) fitted with a Jiffy LM mixer blade (Jiffy Mixer Co.). Details of the components included in Table 1 include:
Polysilazane 1: nanoShell Permanent Protector from nanoShell Company (Plymouht, Devon, UK), polysilazane dissolved in tert-butyl acetate;
Polysilazane 2: PSF from KadKo Inc. (Beech Grove, Ind.), polysilazane dissolved in amyl acetate and hydrocarbon solvent;
Polysilazane 3: Cerakote™ MC156 from NIC Industries (White City, Oreg.), polysilazane dissolved in tert-butyl acetate;
Fluorinated acrylate copolymer 1: APG-658 from Advanced Polymer Inc. (Carlstadt, N.J.), fluorinated acrylate copolymer dissolved in mineral spirits;
Fluorinated acrylate copolymer 2: APG-801 from Advanced Polymer Inc., fluoroacrylate dissolved in mineral spirits;
Fluorinated acrylate copolymer 3: Novec™ 2702 from 3M Co. (St. Paul, Minn.), fluorinated acrylate copolymer dissolved in ethoxy-nonfluorobutane solvent;
Solvent: Oxsol® 100 from MANA Co. (New York, N.Y.), parachlorobenzotrifluoride.

TABLE 1A

| Component | Example 1 | Example 2 | Example 3 | Example 4 | Example 5 | Example 6 |
|---|---|---|---|---|---|---|
| Polysilazane 1 | 200 g | 200 g | — | — | 200 g | 200 g |
| Polysilazane 2 | — | — | 160 g | 160 g | — | — |
| Polysilazane 3 | — | — | — | — | — | — |
| Fluorinated acrylate copolymer 1 | 18 g | — | — | 8 g | 18 g | — |
| Fluorinated acrylate copolymer 2 | — | 18 g | 8 g | — | — | 18 g |
| Fluorinated acrylate copolymer 3 | — | — | — | — | — | — |
| Solvent | — | — | — | — | 18 g | 18 g |

TABLE 1B?

| Component | Example 7 | Example 8 | Example 9 | Example 10 | Example 11 | Example 12 |
|---|---|---|---|---|---|---|
| Polysilazane 1 | — | — | 200 g | — | — | — |
| Polysilazane 2 | 160 g | 160 g | — | 160 g | — | — |
| Polysilazane 3 | — | — | — | — | 220 g | 220 g |
| Fluorinated acrylate copolymer 1 | — | 8 g | — | — | — | — |
| Fluorinated acrylate copolymer 2 | 8 g | — | — | — | — | — |
| Fluorinated acrylate copolymer 3 | — | — | 56 g | 56 g | 66 g | 66 g |
| Solvent | 12 g | 12 g | 54 g | 54 g | — | 34 g |

The components of each inventive example were added in successive steps beginning with the polysilazane component which was added with agitation of about 200 revolutions per minute ("RPM"). Subsequently, the fluorinated acrylate copolymer was added to the solution and mixed for about 30 minutes. During mixing, the solution was maintained at about 23° C. and was covered with a polyethylene film to prevent evaporation of the solvent.

In Examples 5-10, and 12 additional solvent was added to the solution and mixed at 23° C. for an additional 30 minutes. All compositions were filtered through a 0.45 micron polytetrafluoroethylene syringe filter obtained from Cole-Parmer Co. (Vernon Hills, Ill.). Examples were then spray coated onto 4"×4" No. 304 stainless steel coupons that were 10 microns thick. The stainless steel surface was first prepared by scrubbing with isopropyl alcohol, then scrubbing with TC 832 alkaline cleaner (available from Tru-Chem Company, Inc. of Columbus, Ohio), rinsed with deionized water, and then allowed to dry. The coatings were sprayed to produce a dry film having a thickness of approximately 4 microns. After spray coating, each sample was allowed to sit for 30 minutes at ambient temperature. The samples were then placed in an oven for 1 hour at 75° C. and at 50% relative humidity. After cooling, the samples were allowed to sit at ambient temperature for an additional 48 hours prior to testing.

Examples 1 to 12 were tested for various physical properties as depicted in Table 2. Repellency to water was measured by contact angle against deionized water using a PG-X Goniometer available from TMI Instruments (New Castle, Del.). Repellency to organic liquids was measured by dropping isopropyl alcohol onto the sample with a pipette from 6 inches above the surface. Once the drop contacted the surface, the speed at which the drop pulled back into itself was rated on a 0-5 scale, where 0 was no pull-back and 5 indicated an immediate pull-back. Hardness was measured by using a pencil hardness tester, according to ASTM D-3363. Test equipment was obtained from Paul Gardner Company (Pompano Beach, Fla.). Adhesion was measured using a cross-hatch adhesion tester, according to ASTM D-3359 with an instrument from Precision Gage and Tool (Dayton, Ohio). Solvent resistance was measured by rubbing isopropyl alcohol ("IPA") and acetone on the surface with a pipette, allowing the solvent to sit for 60 seconds, and then rubbing with a Q-tip. Observations were recorded as to whether the coating suffered visible damage. If the coating was not damaged, a ("+") was recorded. If the coating was damaged, a ("−") was recorded.

TABLE 2

| | Contact Angle Water (Degrees) | IPA Pull-Back | Pencil Hardness | Cross-Hatch Adhesion | Solvent Resistance IPA | Solvent Resistance Acetone |
|---|---|---|---|---|---|---|
| Example 1 | 96.4 | 1 | 8 H | 100 | + | − |
| Example 2 | 94.4 | 3 | 8 H | 100 | + | + |
| Example 3 | 96.2 | 3 | 8 H | 100 | + | + |
| Example 4 | 96.2 | 3 | 8 H | 100 | + | + |
| Example 5 | 96.6 | 1 | 8 H | 100 | + | − |
| Example 6 | 94.2 | 3 | 8 H | 100 | + | + |
| Example 7 | 95.5 | 3 | 8 H | 100 | + | + |
| Example 8 | 96.5 | 3 | 8 H | 100 | + | + |
| Example 9 | 94.2 | 3.5 | 8 H | 100 | + | + |
| Example 10 | 103.2 | 3 | 8 H | 100 | + | + |
| Example 11 | 103.5 | 5 | 9 H | 100 | + | + |
| Example 12 | 103.3 | 5 | 9 H | 100 | + | + |

As reported in Table 2, Examples 1 to 12 had a variety of good physical properties. For example, each of Examples 1 to 12 were hydrophobic as they exhibited water contact angles greater than about 90°. Additionally, each of Examples 1 to 12 also had strong adhesion and strength as demonstrated by positive results in the pencil hardness test, the cross hatch adhesion test, and solvent resistance tests. Oleophobicity was observed for Examples 2 to 4 and Examples 6 to 12 as evidenced by isopropyl alcohol pull-back results of at least 3.

Examples 1 to 12 were also measured for abrasion resistance according to ASTM D-2486 by rubbing each sample 2,000 times with 100% cotton, deionized water, or isopropyl alcohol using a JTX-11 instrument, available from Pushen Chemical Machinery Company (Shanghai, China). The water contact angles after abrasion testing are reported in Table 3. Examples 3, 7, and 10-12 demonstrated strong abrasion resistance by exhibiting little decrease in water contact angles.

TABLE 3

| | 100% Cotton (degrees) | Water (degrees) | IPA (degrees) |
|---|---|---|---|
| Example 1 | 85.1 | 71.6 | 66.9 |
| Example 2 | 88.4 | 85.8 | 87.3 |
| Example 3 | 94.2 | 96.1 | 91.4 |
| Example 4 | 88.2 | 88.2 | 76.9 |
| Example 5 | 85.1 | 72.8 | 68 |
| Example 6 | 86.2 | 84.5 | 86.2 |
| Example 7 | 95.3 | 96.3 | 89.5 |
| Example 8 | 88.6 | 86.2 | 75.4 |
| Example 9 | 89 | 90.9 | 75.1 |
| Example 10 | 98.7 | 97.9 | 96.2 |
| Example 11 | 100.2 | 99.3 | 97.2 |
| Example 12 | 101.0 | 100.2 | 96.5 |

As used herein, all percentages (%) are percent by weight of the total composition, also expressed as weight/weight %, % (w/w), w/w, w/w % or simply %, unless otherwise indicated. Also, as used herein, the terms "wet" refers to relative percentages of the coating composition in a dispersion medium (e.g. water); and "dry" refers to the relative percentages of the dry coating composition prior to the addition of the dispersion medium. In other words, the dry percentages are those present without taking the dispersion medium or solvating medium into account. Wet admixture refers to the coating composition with the dispersion medium or solvating medium added. "Wet weight percentage", or the like, is the weight in a wet mixture; and "dry weight percentage", or the like, is the weight percentage in a dry composition without the dispersion medium. Unless otherwise indicated, percentages (%) used herein are dry weight percentages based on the weight of the total composition.

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A coating composition comprising:
   a polysilazane, the polysilazane having at least one reactive site; and
   a fluoroacrylate copolymer; and
   wherein the fluoroacrylate copolymer is included at about 1 part fluoroacrylate copolymer to about 3 parts to about 800 parts polysilazane.

2. The coating composition of claim 1, wherein the fluoroacrylate copolymer is a perfluoroacrylate.

3. The coating composition of claim 1, further comprising one or more additives selected from the group consisting of color dyes, color pigments, UV stabilizers, light stabilizers, antioxidants, flame retardants, antimicrobial compounds, stabilizers, fillers, solvents, or rheology modifying agents.

4. The coating composition of claim 1 is colorless.

5. The coating composition of claim 1 comprises one or more of the properties of hydrophobicity or oleophobicity.

6. A method of forming a coated article, the method comprising:
   providing a substrate;
   coating the substrate with a coating composition, the coating composition comprising:
     a polysilazane, the polysilazane having at least one reactive site; and
     a fluoroacrylate copolymer; and
   curing the coating composition; and
   wherein the fluoroacrylate copolymer is included at about 1 part fluoroacrylate copolymer to about 3 parts to about 800 parts polysilazane.

7. The method of claim 6, wherein the curing the coating composition takes place in a coincident step.

8. An article comprising:
   a substrate;
   a hydrophobic coating layer, the hydrophobic coating layer adhering to at least a portion of the substrate; and
   wherein the hydrophobic coating layer is formed from a coating composition comprising:
     a polysilazane, the polysilazane having at least one reactive site; and
     a fluoroacrylate copolymer; and
     wherein the fluoroacrylate copolymer is included at about 1 part fluoroacrylate copolymer to about 3 parts to about 800 parts polysilazane.

9. The article of claim 8, wherein the hydrophobic coating layer comprises a thickness of about 0.1 micron or greater.

10. The article of claim 8, wherein the hydrophobic coating layer comprises a thickness of about 4 microns or greater.

11. The article of claim 8, wherein the substrate is a solder paste stencil.

12. The article of claim 8 comprises a mechanical part, the mechanical part selected from the group consisting of mobile devices, metal parts, polymeric parts, painted parts, and glass parts.

13. The article of claim 8, wherein the hydrophobic coating layer is oleophobic.

14. The article of claim 13, wherein n-hexadecane has a contact angle of about 50° to about 80°, or more, with the hydrophobic coating layer.

15. The article of claim 8, wherein the hydrophobic coating layer has a surface energy of about 13 to about 20 dynes/cm$^2$.

16. The article of claim 8, wherein the hydrophobic coating layer has a pencil hardness test result of at least 8H when tested in accordance with ASTM D-3363.

17. The article of claim 8, wherein the hydrophobic coating layer has a water contact angle of at least about 90° after 2,000 strokes with 100% cotton, deionized water, or isopropyl alcohol in accordance with ASTM D-2486.

18. The coating composition of claim 1 is thermally cured.

* * * * *